United States Patent
Hacker et al.

(10) Patent No.: US 8,494,753 B2
(45) Date of Patent: Jul. 23, 2013

(54) METHOD AND DEVICE FOR OPERATING AN INTERNAL COMBUSTION ENGINE

(75) Inventors: Frank Hacker, Regenstauf (DE); Gerhard Haft, Obermotzing (DE)

(73) Assignee: Continental Automotive GmbH, Hannover (DE)

( * ) Notice: Subject to any disclaimer, the term of this patent is extended or adjusted under 35 U.S.C. 154(b) by 558 days.

(21) Appl. No.: 12/864,505

(22) PCT Filed: Dec. 10, 2008

(86) PCT No.: PCT/EP2008/067210
§ 371 (c)(1),
(2), (4) Date: Jul. 25, 2010

(87) PCT Pub. No.: WO2009/092496
PCT Pub. Date: Jul. 30, 2009

(65) Prior Publication Data
US 2010/0312458 A1  Dec. 9, 2010

(30) Foreign Application Priority Data

Jan. 24, 2008  (DE) .......................... 10 2008 005 883

(51) Int. Cl.
*G06F 19/00* (2011.01)
*F02D 41/04* (2006.01)
*F02D 41/14* (2006.01)

(52) U.S. Cl.
USPC ........... 701/103; 701/109; 701/110; 123/676; 123/672; 123/494; 123/575

(58) Field of Classification Search
USPC ................. 123/1 A, 304, 431, 478, 480, 494, 123/575, 672, 676, 679; 701/102–104, 109, 701/110, 114, 115; 73/23.31, 23.32, 304 C
See application file for complete search history.

(56) References Cited

U.S. PATENT DOCUMENTS

| | | | | |
|---|---|---|---|---|
| 5,144,916 A | * | 9/1992 | Yoshida et al. | 123/41.15 |
| 5,179,926 A | * | 1/1993 | Ament | 123/494 |
| 5,182,942 A | | 2/1993 | Hartel et al. | 73/61.46 |
| 5,901,671 A | | 5/1999 | Huff et al. | 123/1 |
| 6,257,174 B1 | | 7/2001 | Huff et al. | 123/1 |
| 6,298,838 B1 | | 10/2001 | Huff et al. | 123/674 |
| 6,880,392 B2 | * | 4/2005 | Lee et al. | 73/114.38 |

(Continued)

FOREIGN PATENT DOCUMENTS

| | | |
|---|---|---|
| DE | 4112574 | 10/1991 |
| DE | 10221337 | 11/2003 |

(Continued)

OTHER PUBLICATIONS

German Office Action for Application No. 10 2008 005 883.1 (3 pages), Oct. 16, 2008.

(Continued)

*Primary Examiner* — Willis R Wolfe, Jr.
(74) *Attorney, Agent, or Firm* — King & Spalding L.L.P.

(57) ABSTRACT

An internal combustion engine can be operated by a fuel mixture consisting of a base fuel and an alternative fuel. Concentration values (ETH_PERC) of the alternative fuel are determined in at least two different ways for operating the internal combustion engine. A reliable concentration value of the alternative fuel is determined depending on the various determined concentration values (ETH_PERC).

20 Claims, 4 Drawing Sheets

U.S. PATENT DOCUMENTS

| | | | |
|---|---|---|---|
| 6,927,583 B2 * | 8/2005 | Vanzuilen et al. | 73/23.2 |
| 6,951,205 B2 | 10/2005 | Joos et al. | 123/491 |
| 7,170,303 B2 * | 1/2007 | Vanzullen et al. | 73/304 C |
| 7,774,124 B2 * | 8/2010 | Streib et al. | 701/101 |
| 2003/0213475 A1 | 11/2003 | Robertson et al. | 123/491 |
| 2009/0308350 A1 | 12/2009 | Haft et al. | 123/436 |
| 2011/0208409 A1 * | 8/2011 | Snyder et al. | 701/109 |

FOREIGN PATENT DOCUMENTS

| | | |
|---|---|---|
| DE | 102006043341 | 3/2008 |
| EP | 0335168 | 10/1989 |
| EP | 1223326 | 7/2002 |
| EP | 1304466 | 4/2003 |
| WO | 2008031641 | 3/2008 |

OTHER PUBLICATIONS

International Search Report and Written Opinion for Application No. PCT/EP2008/067210 (13 pages), Jun. 17, 2009.

Trankler H.-R., Obermeier E.: Sensortechnik, Springer Verlag Berlin, ISBN 3-540-58640-7, p. 19 (2 pages), 1998.

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2008/067210 filed Dec. 10, 2008, which designates the United States of America, and claims priority to German Application No. 10 2008 005 883.1 filed Jan. 24, 2008, the contents of which are hereby incorporated by reference in their entirety.

TECHNICAL FIELD

The invention relates to a method and device for operating an internal combustion engine. The internal combustion engine is operable with a fuel mixture comprising a basic fuel and an alternative fuel.

BACKGROUND

A flexible fuel vehicle (FFV) is a vehicle that is operable with a fuel mixture comprising a basic fuel and an alternative fuel. The basic fuel is for example petrol and the alternative fuel is for example ethanol. At appropriate filling stations for example a petrol-ethanol mixture is sold, the ethanol component of which lies between 0% and 85%. Depending on the alternative fuel component, a different fresh air mass is required for full combustion of a defined fuel mixture quantity.

From U.S. Pat. No. 5,182,942 A, a method of determining an ethanol component in a fuel mixture is known. For this purpose a sample of the fuel mixture is heated and its evaporation temperature is acquired. In dependence upon the evaporation temperature the ethanol content of the fuel is inferred.

SUMMARY

According to various embodiments, a method and a device for operating an internal combustion engine can be provided that contribute towards a percentage value of an alternative fuel of a fuel mixture of the internal combustion engine being reliably determinable.

According to an embodiment, in a method of operating an internal combustion engine that is operable with a fuel mixture comprising a basic fuel and an alternative fuel, percentage values of the alternative fuel are determined in at least two different ways and in dependence upon the differently determined percentage values a reliable percentage value of the alternative fuel is determined.

According to a further embodiment, a lambda-based percentage value of the alternative fuel can be determined in dependence upon a determined lambda value of the internal combustion engine. According to a further embodiment, it may be checked whether a lambda probe of the internal combustion engine is ready to use, and the determined lambda value can be determined in dependence upon a determined deflection of a lambda controller if the lambda probe is usable, and otherwise the determined lambda value can be determined in dependence upon a determined irregular running value of the internal combustion engine. According to a further embodiment, a first lambda-based percentage value can be determined in dependence upon the determined irregular running value and a second lambda-based percentage value can be determined in dependence upon the determined deflection of the lambda controller and the reliable percentage value can be determined in dependence upon the first and the second determined lambda-based percentage value. According to a further embodiment, an irregular-running-based percentage value of the alternative fuel can be determined in dependence upon an exceeding of a lean-running threshold value of the internal combustion engine. According to a further embodiment, at a time soon after an engine start at least one of the lambda-based percentage values of the alternative fuel can be determined and after determination of the corresponding lambda-based percentage value or values of the alternative fuel the irregular-running-based percentage value of the alternative fuel can be determined and in dependence upon the determined lambda-based percentage values and the determined irregular-running-based percentage value of the alternative fuel the reliable percentage value of the alternative fuel can be determined. According to a further embodiment, after detection of a fuel level change of a fuel level in a fuel tank of the internal combustion engine between the determination of the lambda-based percentage values and the determination of the irregular-running-based percentage value, in dependence upon the fuel level change a fuel-level-based percentage value of the alternative fuel can be determined and in dependence upon the determined lambda-based, the determined fuel-level-based and the determined irregular-running-based percentage values the reliable percentage value can be determined.

According to another embodiment, a device for operating an internal combustion engine that is operable with a fuel mixture comprising a basic fuel and an alternative fuel, may be designed to determine percentage values of the alternative fuel in at least two different ways and to determine a reliable percentage value of the alternative fuel in dependence upon the differently determined percentage values.

BRIEF DESCRIPTION OF THE DRAWINGS

There now follows a detailed description of exemplary embodiments with reference to diagrammatic drawings.
The drawings show:
FIG. 1 an internal combustion engine,
FIG. 2 a first diagram,
FIG. 3 a second diagram,
FIG. 4 a third diagram,
FIG. 5 a flowchart of a first program for operating the internal combustion engine,
FIG. 6 a flowchart of a second program for operating the internal combustion engine.
In all of the figures, elements of an identical construction or function are denoted by the same reference characters.

DETAILED DESCRIPTION

According to various embodiments, in a method and a device for operating an internal combustion engine, the internal combustion engine is operable with a fuel mixture comprising a basic fuel and an alternative fuel. Percentage values of the alternative fuel are determined in at least two different ways. In dependence upon the differently determined percentage values a reliable percentage value of the alternative fuel is determined.

By determining the percentage values of the alternative fuel in at least two different ways, at least two percentage values are obtained. The different ways of determining the percentage value, and in particular the determined percentage values make it possible to compensate errors in determining the percentage values and hence determine the reliable percentage value in a particularly reliable manner. Reliable in the present context means that the determined reliable percentage value corresponds particularly well to an actual percentage value of the alternative fuel. The reliable percentage value may be determined for example by means of averaging the determined percentage values. The basic fuel is preferably petrol and the alternative fuel is for example ethanol.

In an embodiment, a lambda-based percentage value of the alternative fuel is determined in dependence upon a determined lambda value of the internal combustion engine. This enables a particularly precise determination of one of the percentage values of the alternative fuel, in particular the lambda-based percentage value of the alternative fuel. The lambda value is representative of an air-fuel ratio before a combustion process in a combustion chamber of the internal combustion engine.

In a further embodiment, it is checked whether a lambda probe of the internal combustion engine is usable. The determined lambda value is determined in dependence upon a determined deflection of a lambda controller, if the lambda probe is usable. Otherwise, the determined lambda value is determined in dependence upon a determined irregular running value of the internal combustion engine. This makes it possible to determine two lambda-based percentage values of the alternative fuel in different ways. The lambda controller is provided for adjusting a defined lambda value, which is determined by the lambda probe. The deflection of the lambda controller is representative of an extent, to which the air- or fuel supply has to be changed in order for an actual lambda value to correspond to the defined lambda value. The determined irregular running value of the internal combustion engine may be determined for example in dependence upon a comparison of cylinder-specific rotational speeds. The cylinder-specific rotational speeds are representative of angular velocities, at which a crankshaft of the internal combustion engine travels a defined cylinder segment that is associated with a cylinder of the internal combustion engine.

In a further embodiment, a first lambda-based percentage value is determined in dependence upon the determined irregular running value. A second lambda-based percentage value is determined in dependence upon the determined deflection of the lambda controller. The reliable percentage value is determined in dependence upon the first and the second determined lambda-based percentage value. This may contribute in a particularly simple manner towards a particularly precise determination of the reliable percentage value.

In a further embodiment, an irregular-running-based percentage value of the alternative fuel is determined in dependence upon an exceeding of a lean-running threshold value of the internal combustion engine. This contributes towards a particularly precise determination of the reliable percentage value. Determining the irregular-running-based percentage value of the alternative fuel in dependence upon the exceeding of the lean-running threshold value represents a further way of determining the percentage value. For determining the irregular-running-based percentage value in dependence upon the exceeding of the lean-running threshold value, the fuel mixture for one of the cylinders of the internal combustion engine is made progressively leaner until the actual irregular running value exceeds the lean-running threshold value. Alternatively, one cylinder only may be operated with a particularly lean mixture, preferably in such a way that in the appropriate cylinder ignition no longer occurs, and then the mixture in this cylinder is enriched until the fuel mixture in the appropriate cylinder ignites once more and/or until the lean-running threshold value is exceeded.

For determining the irregular-running-based percentage value, the control variable is the irregular running value of the internal combustion engine, which is compared with the lean-running threshold value. In contrast thereto, for determining the lambda-based percentage value in dependence upon the irregular running value, the irregular running value is used to determine the lambda value, in dependence upon which the lambda-based percentage value is then determined.

In a further embodiment, at a time soon after an engine start at least one of the lambda-based percentage values of the alternative fuel is determined. After determining the corresponding lambda-based percentage value or values of the alternative fuel, the irregular-running-based percentage value of the alternative fuel is determined. In dependence upon the determined lambda-based percentage values and the determined irregular-running-based percentage value of the alternative fuel the reliable percentage value of the alternative fuel is determined. This contributes towards a particularly precise determination of the reliable percentage value of the alternative fuel.

In a further embodiment, after detection of a fuel-level change of a fuel level in a fuel tank of the internal combustion engine between the determination of the lambda-based percentage values and the determination of the irregular-running-based percentage value, in dependence upon the fuel-level change a fuel-level-based percentage value of the alternative fuel is determined. In dependence upon the determined lambda-based, the determined fuel-level-based and the determined irregular-running-based percentage values the reliable percentage value is determined. This contributes towards a particularly precise correspondence of the reliable percentage value to the actual percentage value of the alternative fuel.

An internal combustion engine (FIG. 1) comprises an intake tract 1, an engine block 2, a cylinder head 3 and an exhaust gas tract 4.

Figure 1:
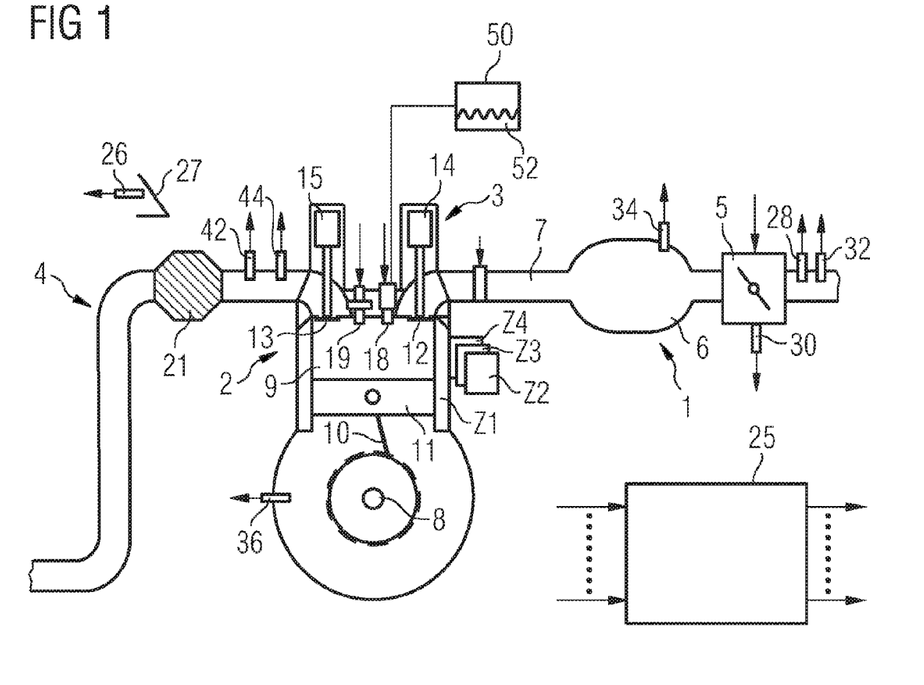

The intake tract 1 preferably comprises a throttle valve 5, a collector 6 and an intake manifold 7, which extends in the direction of a cylinder Z1 through an inlet channel into a combustion chamber 9 of the engine block 2. The engine block 2 further comprises a crankshaft 8, which is coupled by a connecting rod 10 to the piston 11 of the cylinder Z1. The internal combustion engine comprises at least one cylinder Z1, preferably however further cylinders Z2, Z3, Z4, but may also comprise any desired larger number of cylinders Z1 to Z4. The internal combustion engine is disposed preferably in a motor vehicle.

The cylinder head 3 comprises a valve gear 14, 15, which is coupled to a gas inlet valve 12 and a gas outlet valve 13. The valve gear 14, 15 comprises at least one camshaft, which is coupled to the crankshaft 8. An injection valve 18 and a spark plug 19 are further disposed in the cylinder head 3. Alternatively, the injection valve 18 may be disposed in the intake manifold 7. In the exhaust gas tract 4 a catalytic exhaust converter 21 is disposed, which preferably takes the form of a three-way catalytic converter.

A fuel tank 50 is further provided, which is at least partially filled with a fuel mixture 52. The fuel mixture 52 is metered to the combustion chamber 9 of the internal combustion engine for a combustion process. The metering is effected preferably by means of the injection valve 18. The fuel mixture 52 comprises a basic fuel and an alternative fuel. The basic fuel is preferably petrol. The alternative fuel is preferably alcohol, for example ethanol. The percentage of alternative fuel is described by a percentage value ETH_PERC (FIG. 2) of the alternative fuel and preferably lies between 0% and 85%.

A control device 25 is provided, associated with which are sensors that acquire various measured variables and determine in each case the measured value of the measured variables. The control device 25 in dependence upon at least one of the measured variables determines manipulated variables, which are then converted into one or more actuating signals for controlling the final control elements by means of corresponding actuators. Operating variables of the internal combustion engine comprise the measured variables or variables derived from the measured variables. The control device 25 may also be described as a device for operating the internal combustion engine.

The sensors are for example a pedal position sensor 26 that acquires an accelerator pedal position of an accelerator pedal 27, an air-mass sensor 28 that acquires an air-mass flow upstream of the throttle valve 5, a throttle-valve position sensor 30 [that] acquires an opening angle of the throttle valve 5, an intake-air temperature sensor 32 that acquires an intake-air temperature, an intake-manifold pressure sensor 34 that acquires an intake-manifold pressure in the collector 6, a crankshaft-angle sensor 36 that acquires a crankshaft angle, with which a rotational speed of the internal combustion engine is then associated. A lambda probe 42 is further provided, which is disposed upstream of the catalytic exhaust converter 21 and acquires for example the residual oxygen content of the exhaust gas and the measuring signal of which is characteristic of the air-fuel ratio in the combustion chamber 9 of the cylinder Z1 before the combustion process. An exhaust-gas temperature sensor 44 may be provided for acquiring an exhaust-gas temperature.

According to various embodiments, any desired subset of the described sensors may be provided or additional sensors may also be provided.

The final control elements are for example the throttle valve 5, the gas inlet- and gas outlet valves 12, 13, the injection valve 18 and/or the spark plug 19.

For full combustion of a defined fuel mixture mass in the combustion chamber 9 a fresh-air mass is required, which is dependent upon the percentage value ETH_PERC of the alternative fuel. Determining the percentage value ETH_PERC of the alternative fuel may therefore contribute towards full combustion of the fuel mixture 52 metered to the combustion chamber 9. This contributes towards a particularly low-emission operation of the internal combustion engine.

A first diagram (FIG. 2) shows a variation of the percentage value ETH_PERC of the alternative fuel as a function of time T. The represented percentage value ETH_PERC of the alternative fuel in this case refers to the fuel mixture 52 that is actually metered to the combustion chamber 9 for the combustion process. At the start of the first diagram a fuel level in the fuel tank 50 is raised by introducing the fuel mixture 52 into the tank 50. The fuel mixture preferably has an alternative fuel component of 0% to 85%. In dependence upon the alternative fuel percentage of the fuel mixture 52 that is introduced into the fuel tank 50, the percentage value ETH_PERC of the alternative fuel changes from an original percentage value ETH_IN to an altered percentage value ETH_FIL. If the fuel tank 50 prior to refueling was not empty, the introduced fuel mixture 52 mixes with the fuel mixture 52 in the tank. This has an effect, after a delay of several crankshaft revolutions, upon the fuel mixture 52 that is actually metered to the combustion chamber 9 because there is still old fuel mixture 52 situated in the supply lines to the injection valves 18 and optionally in a fuel rail and this fuel mixture 52 only gradually mixes with the newly introduced fuel mixture 52.

Figure 2:
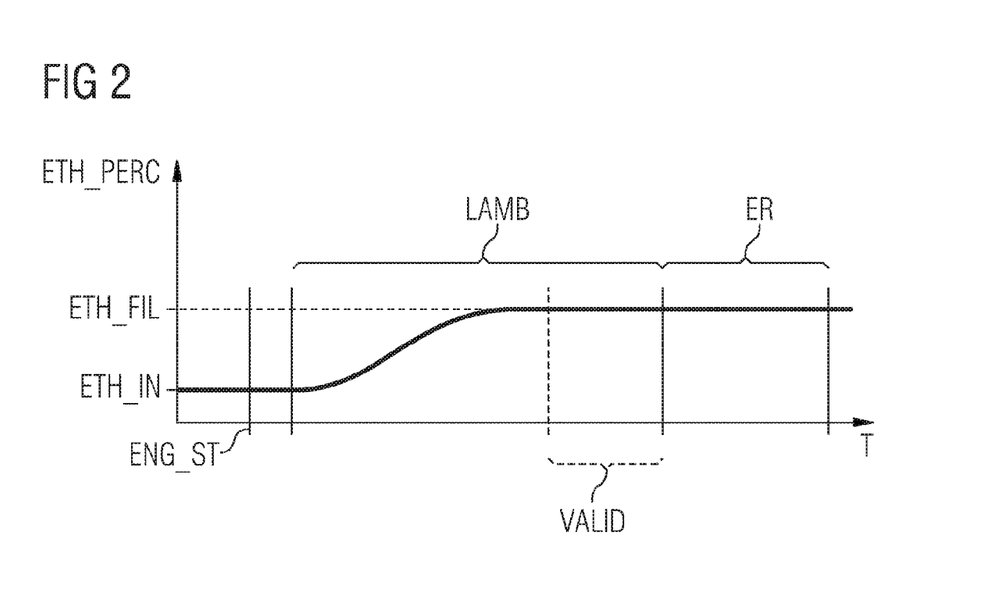

Shortly after an engine start ENG_ST of the internal combustion engine a lambda-based percentage value determination LAMB is started. The lambda-based percentage value determination LAMB preferably has a validation area VALID at the end of the lambda-based percentage value determination LAMB, in which the lambda-based percentage value determination is particularly precise. The lambda-based percentage value determination LAMB is preferably followed by an irregular-running-based percentage value determination ER.

Figure 3:
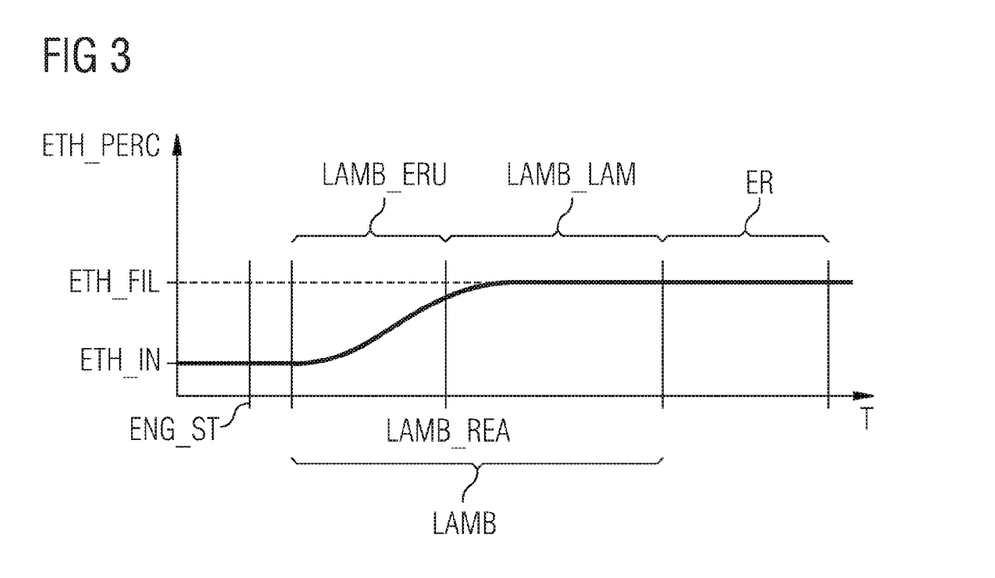

The lambda-based percentage value determination LAMB may comprise a lambda-based percentage value determination LAMB_ERU by means of irregular running determination and/or a lambda-based percentage value determination LAMB_LAM by means of lambda probe 42 (FIG. 3). If the lambda probe 42 is ready to use, preferably the lambda-based percentage value determination LAMB_LAM by means of lambda probe 42 is carried out. Preferably for this purpose a lambda value is determined by means of the lambda probe 42. The lambda value is representative of the air-fuel ratio of the air-fuel mixture before the combustion process in the combustion chamber 9. For this purpose, the lambda probe 42 acquires a residual oxygen content of an exhaust gas of the internal combustion engine, in dependence upon which the air-fuel ratio before the combustion process may be determined. In dependence upon the percentage of alternative fuel the residual oxygen content of the exhaust gas also changes, which leads to a change of the lambda value. Thus, in dependence upon the determined lambda value the percentage of alternative fuel may be inferred.

Additionally or alternatively, for example if the lambda probe 42 is not ready to use, the lambda-based percentage value determination LAMB_ERU may be carried out by means of irregular running determination. The lambda-based percentage value determination LAMB_ERU by means of irregular running determination comprises a determination of the irregular running value. The irregular running value is determined in dependence upon cylinder-specific rotational speeds of the crankshaft 8 of the internal combustion engine. For example, angular velocities, at which the crankshaft 8 crosses a defined crankshaft segment that is associated with a defined cylinder Z1 to Z4, are determined. By comparing a plurality of angular velocities for different crankshaft segments that are associated with different cylinders Z1 to Z4, the irregular running value is determined. The cylinder-specific angular velocity of the crankshaft 8 is dependent upon the air-fuel ratio of the fuel mixture 52 metered to the corresponding cylinder. Thus, in dependence upon the determined irregular running value the lambda value of the internal combustion engine may be determined. By means of the determined lambda value it is then possible in turn to carry out the lambda-based percentage value determination LAMB. The lambda-based percentage value determination by means of lambda probe 42 is started preferably when a state of readiness for use LAM_REA of the lambda probe 42 is detected.

For the irregular-running-based percentage value determination ER first the irregular-running value is also determined, but the lambda value is not determined in dependence thereon. In contrast thereto, for the irregular-running-based percentage value determination ER the air-fuel mixture of at least one of the cylinders Z1 to Z4 is made progressively leaner until the irregular running value resulting therefrom exceeds a defined lean-running threshold value. The higher the percentage of alternative fuel, the leaner the mixture may be made without the defined lean-running threshold value being exceeded. Thus, in dependence upon the exceeding of the lean-running threshold value by the irregular running value the irregular-running-based percentage value determination ER may be carried out.

Alternatively, the air-fuel mixture of at least one of the cylinders Z1 to Z4 may be made lean enough for the lean-running threshold value to be reliably exceeded. The air-fuel mixture may then be enriched until the lean-running threshold value is exceeded. On the basis of the exceeding of the lean-running threshold value by the irregular running value, the irregular-running-based percentage value determination ER may then be carried out. Further or comparable irregular-running-based percentage value determinations ER are disclosed in U.S. Pat. No. 6,298,838 B1 and U.S. Pat. No. 5,950, 599 A1.

Figure 4:
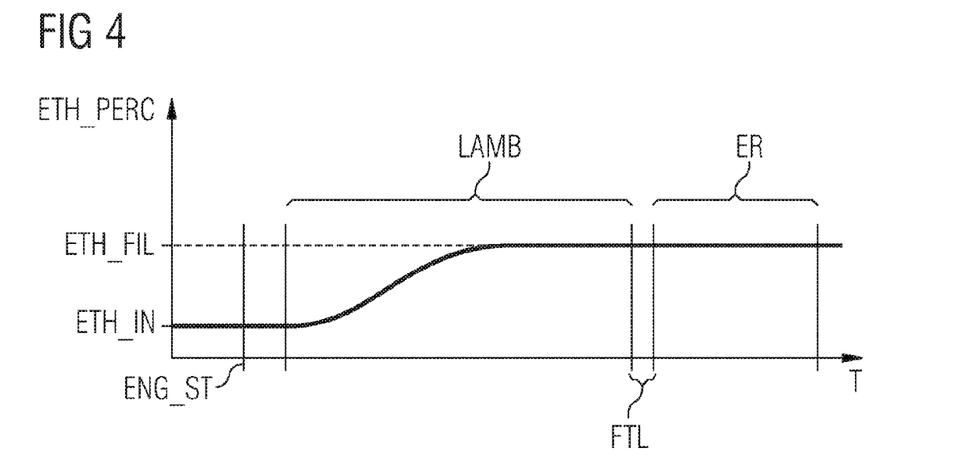

Preferably, between the lambda-based percentage value determination LAMB and the irregular-running-based percentage value determination ER a fuel-level-based percentage value determination FTL is carried out (FIG. 4). A comparable fuel-level-based percentage value determination is disclosed in U.S. Pat. No. 5,950,599 A1. In this case, in dependence upon a fuel level change of the fuel mixture 52 in the tank 50 and in dependence upon a maximum or minimum percentage value of the subsequently introduced fuel, for example 0% to 85%, a maximum or minimum possible percentage value of the alternative fuel is determined. This may then be compared with a result of a lambda-based percentage value determination LAMB, with the maximum or minimum percentage value being used as the actual percentage value, which lies closer to the result of the lambda-based percentage value determination LAMB.

Figure 5:
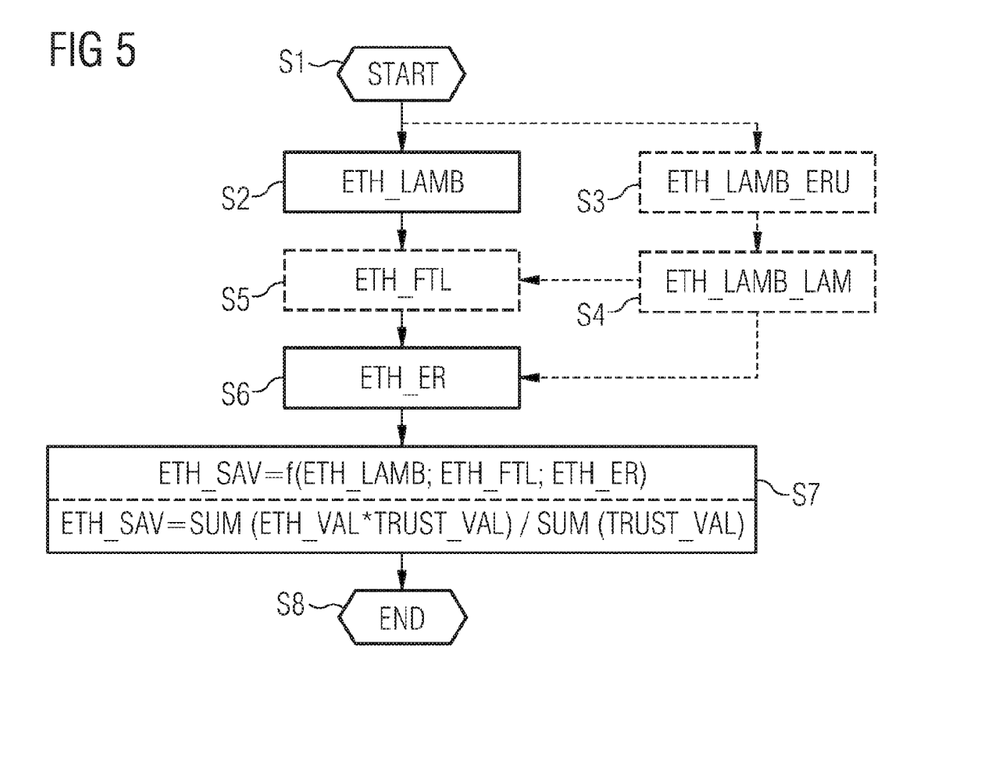

On a storage medium of the control device 25 preferably a first program for operating the internal combustion engine is stored (FIG. 5). The first program is used to determine a reliable percentage value ETH_SAV of the alternative fuel.

The first program is preferably started in a step S1, in which optionally variables are initialized.

In a step S2 a lambda-based percentage value ETH_LAMB is determined by means of the lambda-based percentage value determination LAMB. In the course of step S2 the steps S3 and S4 may be executed.

In step S3, by means of the lambda-based percentage value determination LAMB_ERU by means of irregular running determination a first lambda-based percentage value ETH_LAMB_ERU is determined. For example, in that in dependence upon the determined irregular running value the lambda value is determined and in that in dependence upon the determined lambda value the first lambda-based percentage value ETH_LAMB_ERU is determined, for example by means of one or more characteristic maps. The characteristic map or maps or optionally further characteristic maps may be recorded for example on an engine test bed.

Alternatively or additionally, in the step S4 a second lambda-based percentage value ETH_LAMB_LAM may be determined by means of the lambda-based percentage value determination LAMB_LAM by means of the lambda probe 42. For example, in that the residual oxygen content of the exhaust gas is acquired by means of the lambda probe 42 and in that in dependence upon the acquired residual oxygen content the lambda value is determined and in that in dependence upon the determined lambda value the second lambda-based percentage value ETH_LAMB_LAM is determined, for example by means of a further characteristic map.

The lambda-based percentage value ETH_LAMB comprises the first and/or the second lambda-based percentage value ETH_LAMB_ERU, ETH_LAMB_LAM. Alternatively, the lambda-based percentage value ETH_LAMB may be determined in dependence upon the first and the second lambda-based percentage value ETH_LAMB_ERU, ETH_LAMB_LAM, for example by generating a mean value.

In a step S5, by means of the fuel-level-based percentage value determination FTL a fuel-level-based percentage value ETH_FTL may be determined.

Preferably, in a step S6 by means of the irregular-running-based percentage value determination ER an irregular-running-based percentage value ETH_ER is determined. If steps S3 and S4 are executed, step S6 may alternatively be omitted.

In a step S7, in dependence upon the determined lambda-based percentage value or values ETH_LAMB, the determined fuel-level-based percentage value ETH_FTL and the determined irregular-running-based percentage value ETH_ER the reliable percentage value ETH_SAV is determined, preferably in accordance with the calculation specification indicated in the step S7. According to this calculation specification a sum SUM is generated by means of products of individual percentage values ETH_PERC and corresponding trust values TRUST_VAL. This sum SUM is then divided by the sum SUM of the trust values TRUST_VAL. The trust values TRUST_VAL may for example be permanently defined for each percentage value ETH_PERC. Alternatively, some of the trust values TRUST_VAL or all of the trust values TRUST_VAL may be determined in dependence upon operating variables of the internal combustion engine. For example, the trust value TRUST_VAL after validation may be set higher for the corresponding lambda-based percentage value than before or without corresponding validation. Furthermore, the trust value TRUST_VAL may be all the higher, the more frequently the corresponding percentage value determination was carried out within a defined time frame. The percentage values ETH_PERC comprise the lambda-based percentage values ETH_LAMB, the fuel-level-based percentage value ETH_FTL and the irregular-running-based percentage value ETH_ER.

In a step S8, the first program may be terminated. Preferably, however, the first program is executed regularly during operation of the internal combustion engine, particularly when the fuel level change is detected.

Figure 6:
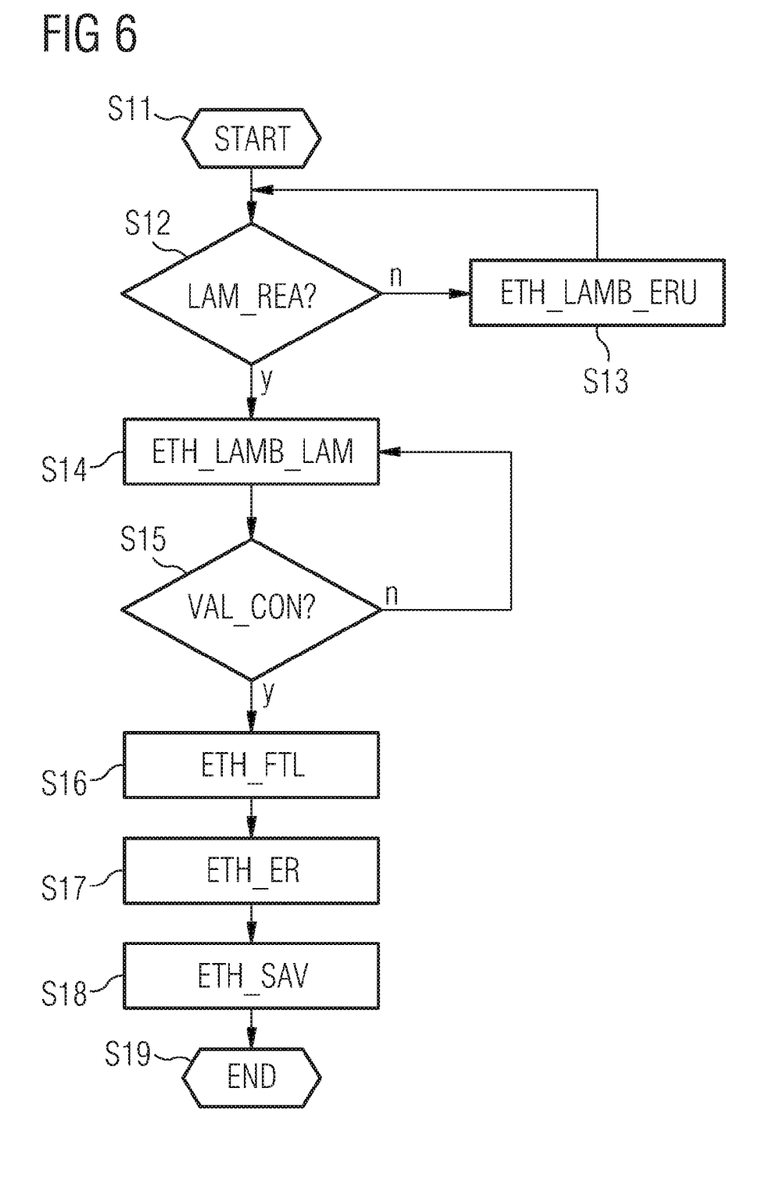

On a storage medium of the control device 25 a second program for determining the reliable percentage value ETH_SAV is preferably stored (FIG. 6). The second program, like the first program, is used for particularly precise determination of the reliable percentage value ETH_SAV. The second program may be an independent program or represent a summarizing of the first program.

The second program is preferably started in a step S11, in which optionally variables are initialized.

In a step S12 the ready-to-use state LAM_REA of the lambda probe 42 is checked. If the condition of step S12 is met, this is representative of the lambda probe 42 being ready to use and the second program is further executed in a step S14. If the condition of step S12 is not met, this is representative of the lambda prove 42 not being ready to use and the second program is continued in a step S13.

In step S13, by means of the lambda-based percentage value determination LAMB_ERU by means of the irregular running determination the first lambda-based percentage value ETH_LAMB_ERU is determined.

In step S14, by means of the lambda-based percentage value determination LAMB_LAM by means of the lambda probe 42 the second lambda-based percentage value ETH_LAMB_LAM of the alternative fuel is determined.

In a step S15, preferably at least one validation condition VAL_CON is checked. The validation condition VAL_CON comprises for example that a cooling-water temperature is greater than a defined cooling-water temperature threshold value and/or that an oil temperature value is greater than a defined oil temperature threshold value. Alternatively or additionally the validation condition VAL_CON may be regarded as met if the internal combustion engine is in quasi-stationary operation and/or in a lower load range of the internal combustion engine. If the condition of step S15 is met, then the lambda-based percentage value determination LAMB is carried out at least one more time and then terminated. If the condition of step S15 is not met, then step S14 is executed afresh.

In a step S16 the fuel-level-based percentage value ETH_FTL is determined.

In a step S17 the irregular-running-based percentage value ETH_ER is determined.

In a step S18 the reliable percentage value ETH_SAV is determined, for example in accordance with step S7 of the first program.

In a step S19 the second program may be terminated. Preferably, however, the second program is executed regularly during operation of the internal combustion engine, in particular after a fuel level change.

What is claimed is:

1. A method of operating an internal combustion engine that is operable with a fuel mixture comprising a basic fuel and an alternative fuel, the method comprising:
   determining percentage values of the alternative fuel in at least two different ways and
   in dependence upon the differently determined percentage values, determining a reliable percentage value of the alternative fuel.

2. The method according to claim 1, wherein a lambda-based percentage value of the alternative fuel is determined in dependence upon a determined lambda value of the internal combustion engine.

3. The method according to claim 2, wherein it is checked whether a lambda probe of the internal combustion engine is ready to use, and wherein the determined lambda value is determined in dependence upon a determined deflection of a lambda controller if the lambda probe is usable, and wherein otherwise the determined lambda value is determined in dependence upon a determined irregular running value of the internal combustion engine.

4. The method according to claim 3, wherein a first lambda-based percentage value is determined in dependence upon the determined irregular running value and wherein a second lambda-based percentage value is determined in dependence upon the determined deflection of the lambda controller and wherein the reliable percentage value is determined in dependence upon the first and the second determined lambda-based percentage value.

5. The method according to claim 1, wherein an irregular-running-based percentage value of the alternative fuel is determined in dependence upon an exceeding of a lean-running threshold value of the internal combustion engine.

6. The method according to claim 5, wherein at a time soon after an engine start at least one of the lambda-based percentage values of the alternative fuel is determined and wherein after determination of the corresponding lambda-based percentage value or values of the alternative fuel the irregular-running-based percentage value of the alternative fuel is determined and wherein in dependence upon the determined lambda-based percentage values and the determined irregular-running-based percentage value of the alternative fuel the reliable percentage value of the alternative fuel is determined.

7. The method according to claim 6, wherein, after detection of a fuel level change of a fuel level in a fuel tank of the internal combustion engine between the determination of the lambda-based percentage values and the determination of the irregular-running-based percentage value, in dependence upon the fuel level change a fuel-level-based percentage value of the alternative fuel is determined and wherein in dependence upon the determined lambda-based, the determined fuel-level-based and the determined irregular-running-based percentage values the reliable percentage value is determined.

8. A device for operating an internal combustion engine that is operable with a fuel mixture comprising a basic fuel and an alternative fuel, wherein the device is configured to determine percentage values of the alternative fuel in at least two different ways and to determine a reliable percentage value of the alternative fuel in dependence upon the differently determined percentage values.

9. The device according to claim 8, wherein the device is configured to determine a lambda-based percentage value of the alternative fuel in dependence upon a determined lambda value of the internal combustion engine.

10. The device according to claim 9, wherein the device is configured to check whether a lambda probe of the internal combustion engine is ready to use, and to determine the lambda value in dependence upon a determined deflection of a lambda controller if the lambda probe is usable, and otherwise to determine the lambda value in dependence upon a determined irregular running value of the internal combustion engine.

11. The device according to claim 10, wherein the device is configured to determine a first lambda-based percentage value in dependence upon the determined irregular running value and a second lambda-based percentage value in dependence upon the determined deflection of the lambda controller and to determine the reliable percentage value in dependence upon the first and the second determined lambda-based percentage value.

12. The device according to claim 8, wherein the device is configured to determine an irregular-running-based percentage value of the alternative fuel in dependence upon an exceeding of a lean-running threshold value of the internal combustion engine.

13. The device according to claim 8, wherein the device is configured to determine at a time soon after an engine start at least one of the lambda-based percentage values of the alternative fuel and to determine after determination of the corresponding lambda-based percentage value or values of the alternative fuel the irregular-running-based percentage value of the alternative fuel and to determine in dependence upon the determined lambda-based percentage values and the determined irregular-running-based percentage value of the alternative fuel the reliable percentage value of the alternative fuel.

14. The device according to claim 13, wherein the device is configured to determine, after detection of a fuel level change of a fuel level in a fuel tank of the internal combustion engine between the determination of the lambda-based percentage values and the determination of the irregular-running-based percentage value, in dependence upon the fuel level change a fuel-level-based percentage value of the alternative fuel and to determine the reliable percentage value in dependence upon the determined lambda-based, the determined fuel-level-based and the determined irregular-running-based percentage values.

15. A motor vehicle comprising an internal combustion engine with an intake tract, an engine block, a cylinder head and an exhaust gas tract with a catalytic exhaust converter, a fuel tank which is at least partially filled with a fuel mixture comprising a basic fuel and an alternative fuel, and a control device associated with which are sensors that acquire various measured variables and wherein the control device is configured to determine in dependence upon at least one of the measured variables manipulated variables, which are then converted into one or more actuating signals for controlling actuators, and wherein the control device is further configured to determine percentage values of the alternative fuel in at least two different ways by means of said sensors and in dependence upon the differently determined percentage values, determining a reliable percentage value of the alternative fuel.

16. The motor vehicle according to claim 15, wherein the intake tract comprises a throttle valve, a collector and an intake manifold which extends in the direction of a cylinder through an inlet channel into a combustion chamber of the engine block and wherein the engine block further comprises a crankshaft which is coupled by a connecting rod to a piston of the cylinder.

17. The motor vehicle according to claim 16, wherein the sensors are selected from the group consisting of: a pedal position sensor that acquires an accelerator pedal position of an accelerator pedal, an air-mass sensor that acquires an air-mass flow upstream of the throttle valve, a throttle-valve position sensor that acquires an opening angle of the throttle valve, an intake-air temperature sensor that acquires an intake-air temperature, an intake-manifold pressure sensor that acquires an intake-manifold pressure in the collector, and a crankshaft-angle sensor that acquires a crankshaft angle.

18. The motor vehicle according to claim 15, further comprising a lambda probe which is disposed upstream of the catalytic exhaust converter.

19. The motor vehicle according to claim 15, further comprising an exhaust-gas temperature sensor.

20. The motor vehicle according to claim 18, wherein the control device is further configured to determine a lambda-based percentage value of the alternative fuel in dependence upon a determined lambda value of the internal combustion engine.

* * * * *